US006731848B2

(12) United States Patent
Jiang et al.

(10) Patent No.: US 6,731,848 B2
(45) Date of Patent: May 4, 2004

(54) DISPERSION COMPENSATING OPTICAL FIBER

(75) Inventors: Lei Jiang, Plano, TX (US); Gang Qi, Painted Post, NY (US); V. Srikant, Ithaca, NY (US); Jeffery S. Stone, Addison, NY (US); Sergey Y. Ten, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 16 days.

(21) Appl. No.: 10/366,915

(22) Filed: Feb. 14, 2003

(65) Prior Publication Data

US 2003/0147612 A1 Aug. 7, 2003

Related U.S. Application Data

(63) Continuation of application No. 10/122,250, filed on Apr. 11, 2002, now Pat. No. 6,546,178, which is a continuation of application No. 09/802,696, filed on Mar. 9, 2001, now Pat. No. 6,445,864.

(60) Provisional application No. 60/192,056, filed on Mar. 24, 2000, and provisional application No. 60/196,437, filed on Apr. 12, 2000.

(51) Int. Cl.[7] .................................................. G02B 6/22
(52) U.S. Cl. ........................................................ 385/127
(58) Field of Search ................................. 385/123, 124, 385/126, 127

(56) References Cited

U.S. PATENT DOCUMENTS

| 6,445,864 B2 | 9/2002 | Jiang et al. ................. 385/127 |
| 6,453,102 B1 * | 9/2002 | Dong et al. ................. 385/123 |
| 6,501,892 B1 | 12/2002 | Okuno et al. ................ 385/127 |
| 2002/0090186 A1 | 7/2002 | Sillard et al. ............... 385/123 |

FOREIGN PATENT DOCUMENTS

WO          WO00/17685         3/2000     ............ G02B/6/16

* cited by examiner

Primary Examiner—Hung N. Ngo
(74) Attorney, Agent, or Firm—Randall S. Wayland; Robert L. Carlson

(57) ABSTRACT

Disclosed is a dispersion compensating optical fiber that includes a refractive index profile selected to provide dispersion at 1550 nm of between −90 and −150 ps/nm/km; dispersion slope at 1550 nm of less than −1.5 ps/nm$^2$/km; and kappa of between 40 and 95. The profile preferably has a core surrounded by a cladding layer of refractive index $\Delta_c$, and at least three radially adjacent regions including a central core region having $\Delta 1$, a moat region having a refractive index $\Delta 2$, and an annular ring region having a refractive index $\Delta 3$, wherein $\Delta 1 > \Delta 3 > \Delta c > \Delta 2$.

13 Claims, 7 Drawing Sheets

DISPERSION COMPENSATING OPTICAL FIBER

CROSS-REFERENCE TO RELATED APPLICATIONS

This application claims priority to, and the benefit of, U.S. provisional applications 60/192,056 filed Mar. 24, 2000 and 60/196,437 filed Apr. 12, 2000, and is a continuation of U.S. application Ser. No. 10/122,250 filed Apr. 11, 2002, now U.S. Pat. No. 6,546,178 which was a continuation of 09/802,696 filed Mar. 9, 2001, now issued U.S. Pat. No. 6,445,864, the disclosures of each of which are hereby incorporated by reference herein.

BACKGROUND OF THE INVENTION

1. Field of the Invention

The present invention relates to dispersion compensating optical fibers that are suitable for use in wavelength division multiplexing (WDM) systems, more particularly to dispersion compensating fibers that are particularly well suited for use in the C-band and L-band operating windows.

2. Technical Background

To meet the ongoing drive for more bandwidth at lower costs, telecommunications system designers are turning to high channel count dense wavelength division multiplexing (DWDM) architectures, longer reach systems and higher transmission bit rates. This evolution makes chromatic dispersion management critical to system performance, as system designers now desire the ability to accurately compensate dispersion across entire channel plans. Typically, the only viable broadband commercial technology to battle dispersion has been dispersion compensating fibers (DCF) modules. As DWDM deployments increase to 16, 32, 40 and more channels, broadband dispersion compensating products are desired. Telecommunications systems presently in place include single-mode optical fibers which are designed to enable transmission of signals at wavelengths around 1550 nm in order to utilize the effective and reliable erbium fiber amplifiers.

One such fiber, LEAF optical fiber, manufactured by Corning Inc., is a positive nonzero dispersion shifted fiber (+NZDSF), and has become the optical fiber of choice for many new system deployments due to its inherently low dispersion and economic advantage over conventional single mode fibers.

With continuing interest in going to even higher bit rates (>40 Gbs), Ultra-long reach systems (>1000 km) and optical networking, it will become imperative to use DCFs in networks that carry data on Non-Zero Dispersion shifted fiber (NZ-DSF) as well. The early versions of DCF's, those developed for single mode fibers, when used in combination with NZ-DSF fibers effectively compensated dispersion at only one wavelength. However, high bit rates, longer reaches and wider bandwidths require dispersion slope to be compensated more exactly. Consequently, it is desirable for the DCF to have dispersion characteristics such that its dispersion and dispersion slope is matched to that of the transmission fiber it is required to compensate. The ratio of dispersion to dispersion slope at a given wavelength is referred to as "kappa ($\kappa$)". Kappa changes as a function of wavelength for a given transmission fiber. Hence, it is equally important that as we migrate to Ultra broadband networks that the kappa value of the DCF is matched to that of the transmission fiber at more than one wavelength.

It would be desirable to develop alternative dispersion compensating fibers, particularly ones having the ability to compensate for dispersion of non-zero dispersion shifted fibers and other positive dispersion optical fibers over a wide wavelength band around 1550 nm.

SUMMARY OF THE INVENTION

One embodiment of the present invention relates to a dispersion compensating optical fiber that includes a refractive index profile selected to provide dispersion at 1550 nm of between −90 and −150 ps/nm/km; dispersion slope at 1550 nm of less than −1.5 ps/nm$^2$/km; and kappa of between 40 and 95. The profile preferably has a core surrounded by a cladding layer of refractive index $\Delta_c$, and the core preferably has at least three radially adjacent regions including a central core region having $\Delta 1$, a moat region having a refractive index $\Delta 2$, and an annular ring region having a refractive index $\Delta 3$, wherein $\Delta 1 > \Delta 3 > \Delta c > \Delta 2$.

In one preferred embodiment, the dispersion slope is between about −1.5 and −3.0 ps/nm$^2$/km, and in another preferred embodiment, the dispersion slope is between about −1.8 and −2.5 ps/nm$^2$/km over the wavelength range 1530 to 1560 nm.

The fibers of the present invention also preferably exhibit a very negative dispersion at 1550 nm, i.e., less than −100 ps/nm/km. Preferred fibers in accordance with the present invention exhibit a kappa value at 1550 nm between 40 and 60. The desired kappa may thus be selected depending on the long haul fiber that is to be compensated. This preferred embodiment is especially useful for compensating the dispersion created in the C-band (e.g., 1530–1565) by an optical communication system which utilizes LEAF® optical fiber.

Fibers disclosed herein may also be used in the L-band (1565–1625 nm). In particular, we have found that insertion losses are achievable which are suitable for making the fibers of the present invention suitable for use in the L-band, i.e., less than 1 dB per kilometer. The fibers which are L-band compatible exhibit a $\kappa$ at 1590 nm which is also greater than 50.

All of the above described properties are achievable utilizing fiber having a refractive index profile which comprises a central segment having a relative refractive index $\Delta 1$, a second annular segment surrounding the central core segment having relative refractive index $\Delta 2$, a third annular segment which surrounds said second segment having relative refractive index $\Delta 3$ and a cladding layer having relative refractive index $\Delta c$, wherein $\Delta 1 > \Delta 3 > \Delta 2$ and:

$$\Delta = \frac{(n_1^2 - n_c^2)}{2 n_1^2} \times 100$$

Preferably, the refractive index profile is selected so that the ratio of the refractive index $\Delta$ of the second core segment to that of the first core segment ($\Delta 2 / \Delta 1$) is greater than −4. More preferably, the ratio of the deltas of the second segment to the first segment $\Delta 2 / \Delta 1$ is greater than −0.37.

If the negative dispersion slope of the fiber is made less than −0.08 ps/nm$^2$/km, the fibers will have particular utility for compensating the dispersion for large effective area (greater than 50, more preferably greater than 60, and most preferably greater than 65) nonzero dispersion shifted fibers. One such fiber, Corning's LEAF® fiber, is a optical fiber having a zero dispersion wavelength outside the range of 1530–1565, and an effective area greater than 70 square microns. LEAF fiber's larger effective area offers higher power handling capability, higher optical signal to noise ratio, longer amplifier spacing, and maximum dense wavelength division multiplexing (DWDM) channel plan flexibility. Utilizing a larger effective area also provides the ability to uniformly reduce nonlinear effects. Nonlinear effects are perhaps the greatest performance limitation in today's multi-channel DWDM systems. The dispersion compensating fibers disclosed herein are exceptional in their ability to compensate for the dispersion of NZDSF fibers, in particular Corning's LEAF fiber. LEAF optical fiber nominally exhibits an effective area of 72 square microns and a total dispersion of 2–6 ps/nm/km over the range 1530–1565.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Figure 1:
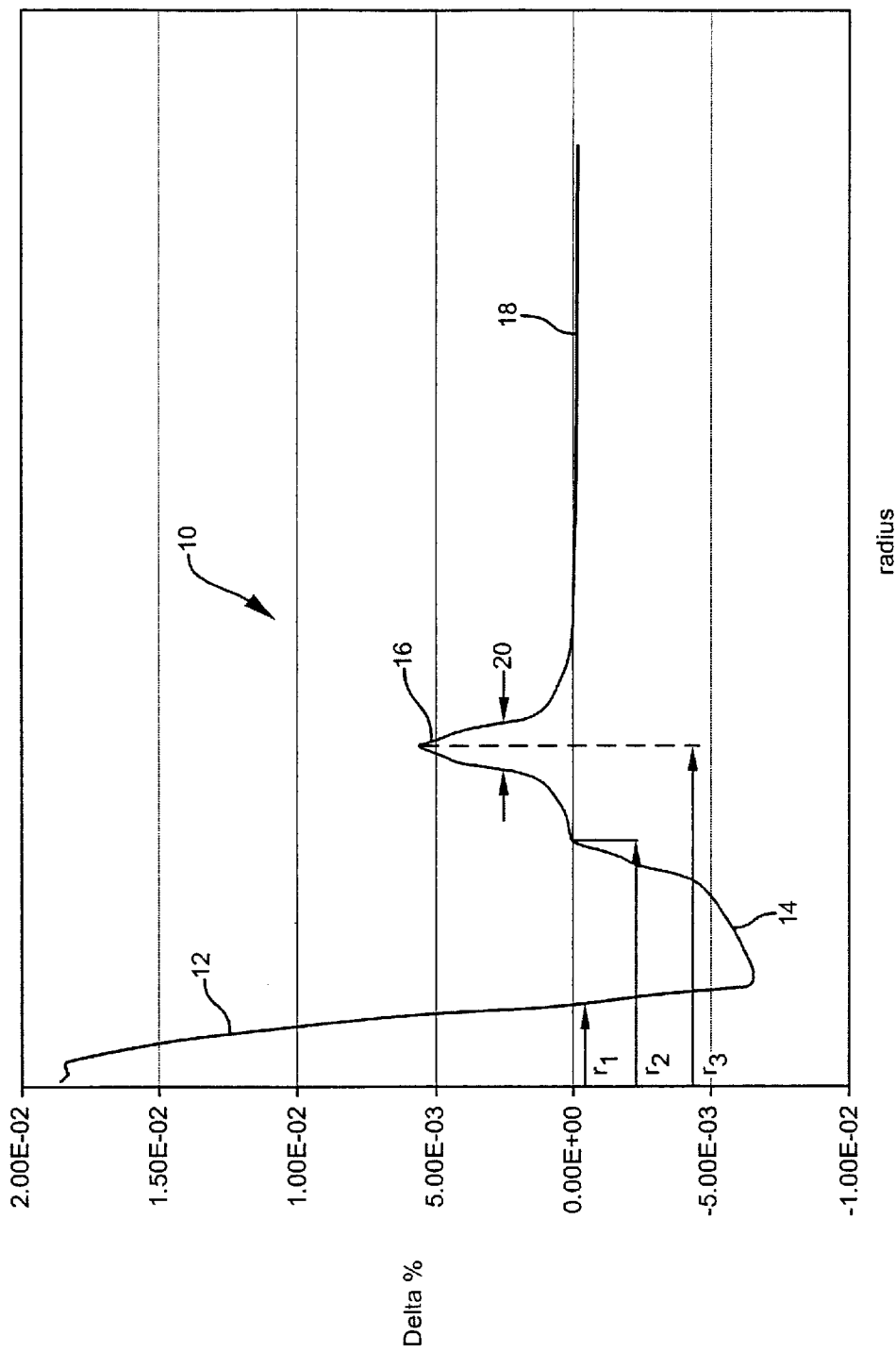
FIGS. 1–4 illustrate refractive index profiles of fibers made in accordance with the invention.

Reference will now be made in detail to the present preferred embodiments of the invention, an example of which is illustrated in the accompanying drawings. Wherever possible, the same reference numbers will be used throughout the drawings to refer to the same or like parts. An exemplary embodiment of a refractive index profile of a fiber in accordance with the present invention is shown in FIG. 1.

Refractive index profile 10 consists of a central up-doped region 12 having peak $\Delta 1$ which is surrounded by a first down-doped moat region 14 having peak negative $\Delta 2$, which is in turn surrounded by annular ring and a second up-doped region 16 having peak $\Delta 3$, all of which are surrounded by cladding region 18. Preferably, regions 12 and 16 are formed using germania doped $SiO_2$, although other forms of index refraction increasing dopants could also be employed to achieve the fibers disclosed herein, so long as the same general refractive index profile is achieved. Likewise, whereas region 14 is preferably formed using fluorine doped $SiO_2$, other index of refraction decreasing dopants could be employed besides fluorine. Cladding region 18 is preferably formed of silica. However, cladding region 13 could also include index of refraction increasing or decreasing dopants, so long as the $\Delta$ versus radius relationship illustrated is maintained.

In one embodiment of the dispersion slope compensating optical fiber illustrated in FIG. 1, $\Delta 1$ ranges between 1.0 and 2.5 percent and comprises an outer radius $r_1$ (in FIG. 1, $r_1$ is drawn to the point where the profile intersects the x-axis) between about 1 to 3 microns, $\Delta 2$ is less than about −0.3 percent, more preferably less than −0.4 percent, and has an outer radius $r_2$ which ranges between about 3.5 and 8 microns, and $\Delta 3$ is between about 0.2 to 1.2 percent and comprises a center radius $r_3$ (drawn to the center of the segment) between about 5 to 12 microns outer radius, as used herein, means the distance measured from the centerline of the optical fiber to the outer region of the segment, i.e., where the outer region of the index segment intersects the x-axis (which is also equal to the index of the cladding material 18). Center radius, on the other hand, is measured to the center of the core segment.

More preferably, $\Delta 1$ of segment 12 is between 1.2 and 2.2 percent and comprises an outer radius $r_1$ between about 1 to 2 microns, $\Delta 2$ of segment 14 is between than about −0.5 and −1.0 percent, and has an outer radius $r_2$ between about 4 and 7 microns.

The third annular segment 16 can vary more in $\Delta$ versus radial dimension than segments 12 and 14. For example, higher and narrower annular rings segment 16 may be replaced by shorter and wider annular ring segment 16 to achieve fiber exhibiting the desired properties in accordance with the invention. For example, in one more preferred embodiment, the third annular segment 16 may be selected from the group consisting of a) a $\Delta 3$ between about 0.5 to 1.0 percent and a center radius of 5 to 12 microns, and a half-height width between about 0.5 to 2.5 microns, and b) a $\Delta 3$ between about 0.1 to 0.5 percent, a center radius of 6 to 12 microns, and a half-height width between about 1.5 to 3 microns.

Most preferably $\Delta 1$ of segment 12 is between 1.0 and 2.5 percent and comprises an outer radius between about 1 to 3 microns, $\Delta 2$ of segment 14 is less than about −0.5 percent, and has outer radius $r_2$ between about 3.5 and 8 microns, and $\Delta 3$ of segment 16 is between about 0.2 to 1.0 percent and comprises a center radius $r_3$ between about 5 to 12 microns.

Fibers made in accordance with the invention may also exhibit a fiber cut off wavelength which is higher than the C or L band (i.e. higher than 1650 nm). Consequently, when clad with silica cladding, the fibers disclosed herein are few moded, rather than single mode, at 1550 nm. Conversely, previous prior art dispersion compensating fibers have been designed to support only one mode in the transmission window of interest. Long haul fibers designed to be few moded with high fiber cutoff wavelengths often support only one mode in the cable as the cabling process reduces the cutoff wavelength. The primary reason why these fibers support only one mode in the cable is because of the fact that the cabling process induces random stress points on the fiber which in turn help in dissipating the energy from the higher order mode. However, in the case of the dispersion compensating fiber module, there is no cabling process and hence, in general, one should not expect any decrease in the cutoff wavelength after the fiber is made. Hence, we would expect that if the fiber supports two (or maybe even three modes) in the fiber form in the 1550 nm operating wavelength, the same fiber will support the same number of modes in the module form as well. However, it should be noted that the fibers disclosed in here do not necessarily have to be employed only in dispersion compensating modules, and instead the fibers could be employed in dispersion compensating fiber cables (rather than enclosed modules that are typically employed in boxes).

However, we have found that, if a DC fiber supports more than one mode, the cross-talk created during the propagation of the higher order modes over a length (e.g. greater than 100 meters, more preferably greater than 500 meters) of straight fiber is 30 dB or less. Consequently, it is possible for dispersion compensating fibers that support more than one mode to have minimal impact on system performance. Moreover, deploying such dispersion compensating fibers in modules wound around a hub of a diameter between about three to five inches, will induce additional stress, and bending of higher order modes will further decrease model noise. Consequently, in a preferred embodiment, the dispersion compensating optical fibers disclosed herein are deployed in such dispersion compensating modules wherein the fiber is wound around a hub. Preferably the hub is cylindrical, and has a diameter of less than about 12 inches, more preferably less than about 10 inches, and most preferably less than about 6 inches, and the length of fiber deployed therein is greater than 100 meters, more preferably greater than 500 meters.

Thus, it is possible to decrease the bend sensitivity of the dispersion compensating fiber by designing the fiber to have a high fiber cut off wavelength. In addition, the fiber design may be modified to increase the fiber cut off wavelength without effecting any of the other optical properties deleteriously.

EXAMPLES

The invention will be further illustrated by the following examples which are meant to be illustrative and an exemplary of the invention.

In Example 1, a fiber having the refractive index profile illustrated in FIG. 1 was made having a central core region 12 with peak Δ=1.85 percent and an outer radius $r_1$ of 1.6 microns, a moat Δ in region 14 of about −0.65 and an outer radius r2 of 5.4 microns (and an average moat Δ equal to about −0.55) and a ring peak Δ equal to about 0.56 with a ring center radius (measured to the center of the core segment) of about 7.8 microns and a half height width of about 1 micron. The raised index regions 12 and 16 were formed using germania doping, and the lowered index region 14 was formed using fluorine doping. Outer clad region 18 was pure silica, and the outer diameter of the resultant fiber was 125 microns. The resultant fiber exhibited a dispersion at 1550 of approximately −107 ps/nm/km, a dispersion slope of about −1.18 and a κ value of about 90. The effective area of this fiber was approximately 16 square microns, and the fiber cutoff wavelength was longer than 1650, the detection limit of the equipment. In fact, for all of the fibers disclosed herein, the fiber cutoff wavelength was too high to be measured using current equipment.

Figure 2:
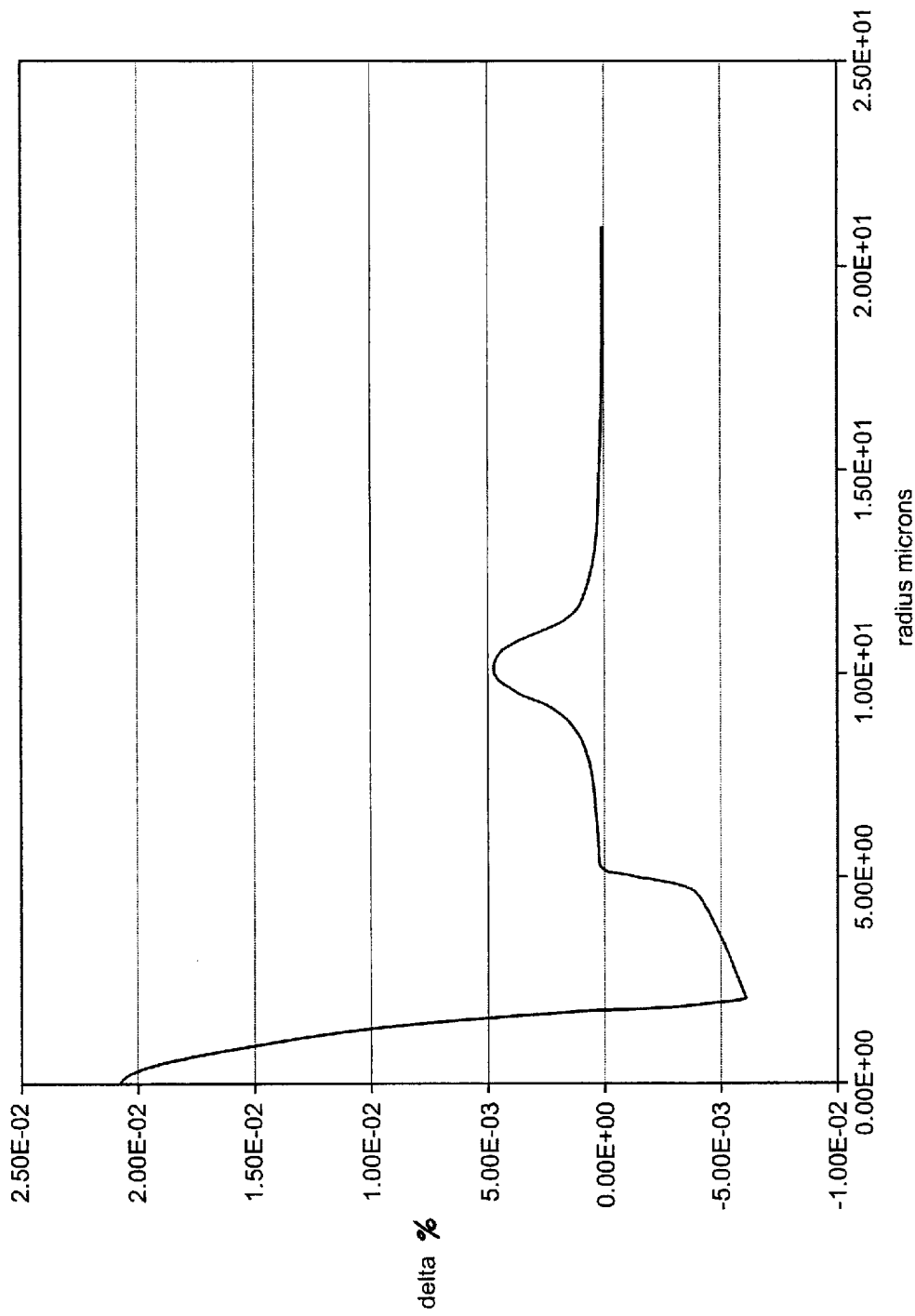
Figure 3:
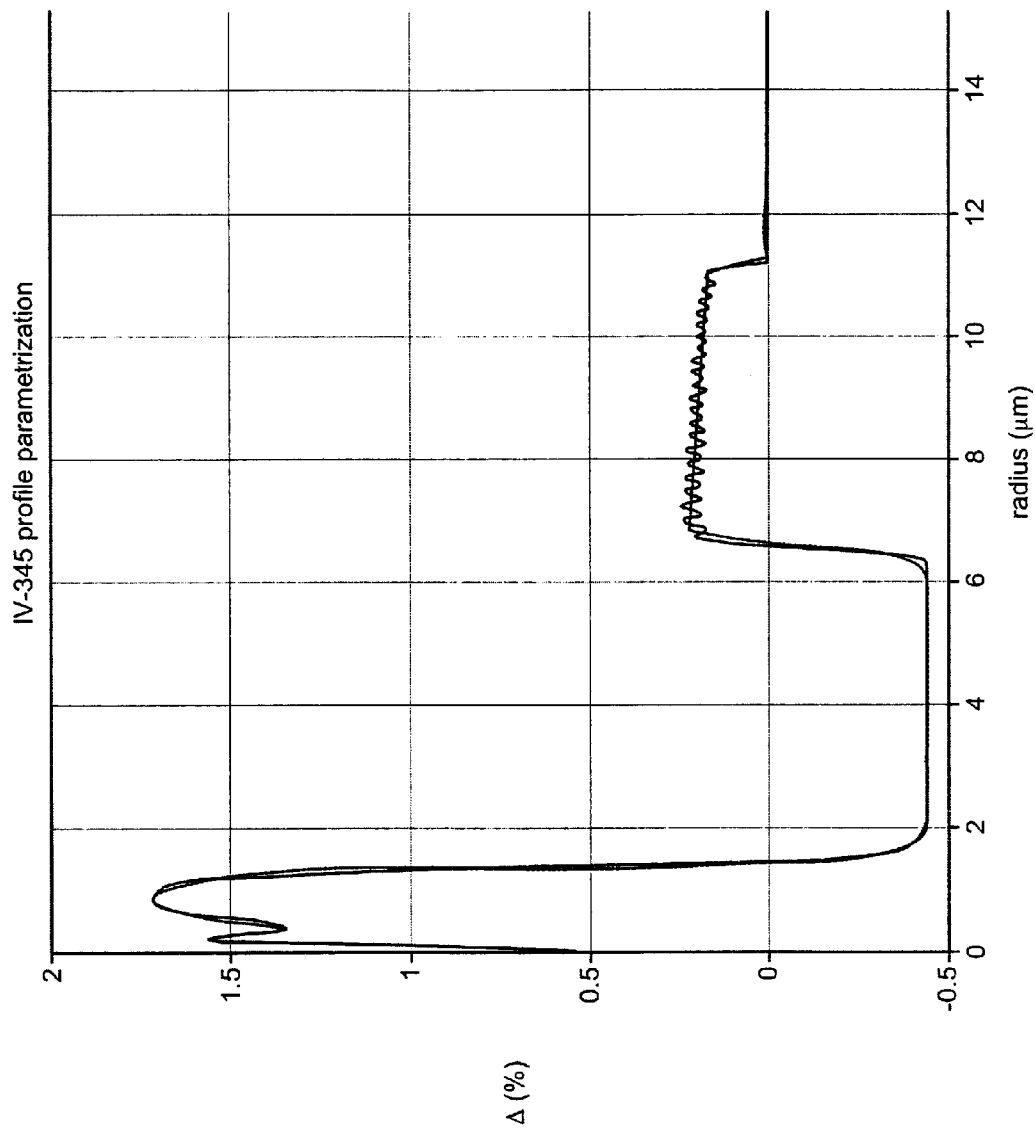

Additional examples of embodiments in accordance with the invention are listed in Tables 1, 2, and 3. The corresponding Δ versus radius relationships of each of these examples is set forth in Table 1 below, wherein the radius of the Δ1 and Δ2 segments is an outer radius, and the radius of Δ3 is a center radius. Also set forth for Δ3 is the half height width. All of the radius and half-height width values are set forth in microns. Also set forth are the corresponding dispersion properties, including dispersion measured at 1550 nm, dispersion slope over the wavelength range 1530–1560, kappa κ as defined above, and fiber cut off wavelength. Examples 2 and 3 are very similar in appearance to FIG. 1, in that, in both such examples, the annular ring segment 16 is a triangular annular ring. On the other hand, examples 4, 6, and 7 are similar to the embodiment illustrated in FIG. 2 in that they employ annular ring segments 16 which are rounded or gaussian in shape. The Example 5 embodiment is illustrated in FIG. 3.

Fibers described in Tables 1 and 2 fall within a particularly preferred range of refractive index profiles in accordance with the invention, in which Δ1 ranges between 1.5 and 2.2 percent and comprises an outer radius $r_1$ (drawn to the point where the profile intersects the x-axis) between about 1 to 3 microns, Δ2 is less than about −0.4 percent, and has an outer radius $r_2$ which ranges between about 4.5 and 7.5 microns, and Δ3 is between about 0.2 to 1.2 percent and comprises a center radius $r_3$ (drawn to the center of the segment) between about 5 to 12 microns outer radius, as used herein, means the distance measured from the centerline of the optical fiber to the outer region of the segment, e.g., where the outer region of the index segment intersects the x-axis (which is also equal to the index of the cladding material 18). Center radius, on the other hand, is measured to the center of the core segment.

TABLE 1

| | Δ1 | Outer $r_1$ (μm) | Δ2 | Outer $r_2$ (μm) | Δ3 | Ctr. $r_3$ (μm) | H. Ht. Width (μm) | $D_{1550}$ | $D_{slope}$ | κ | Fiber cutoff |
|---|---|---|---|---|---|---|---|---|---|---|---|
| Ex. 2 | 1.86 | 1.6 | −.66 | 5.4 | .56 | 7.8 | 2 | −104 | −1.15 | 91 | >1650 |
| Ex. 3 | 2.02 | 1.7 | −.68 | 5 | .88 | 7 | 1 | −183 | −1.93 | 95 | >1650 |
| Ex. 4 | 2.1 | 1.7 | −.6 | 5 | .48 | 10.1 | 1.9 | −75 | −1 | 75 | >1650 |
| Ex. 5 | 1.7 | 1.4 | −.45 | 6.6 | .2 | 8.8 | 4.3 | −163 | −3.38 | 49 | >1650 |
| Ex. 6 | 2.06 | 1.79 | −.6 | 5.14 | 4.82 | 10.1 | 2 | −141 | −2.11 | 66 | >1650 |

As the role of waveguide dispersion is made larger in order to attain DCF's with ultra high negative dispersion slopes, the DCFs become more bend sensitive. One way to reduce the bend sensitivity of the fiber is to reduce the effective area of the fiber. This however can have negative impact on the system performance via increased non-linear effects. Hence, proper design of a DCF with high negative dispersion slope for broadband WDM systems requires a careful optimization of the bend sensitivity of the fiber while keeping the effective area of the fiber as large as possible.

The effective area of all of the examples in Table 1 were between 15 and 17 $\mu m^2$ and attenuation was less than 1 dB/km. All of the results shown in Table 1 above are for fibers that were drawn to 125 micron diameter fiber. These resultant properties can be modified to some extent by drawing the optical fibers to larger or smaller diameters. For example, when the profile disclosed in FIG. 2 was drawn to a diameter of 120 microns, the dispersion at 1550 was −232 ps/nm/km, the dispersion slope was −2.52 ps/nm$^2$/km, and the κ value remained at about 92.

The fiber described in Table 2 below has excellent utility as a fiber for use in the L-band to compensate for the dispersion created in optical communications systems which employ LEAF fiber. The properties at 1590 nm for this fiber are set forth in Table 2. At 1550, the Example 7 fiber exhibits a κ value of about 92, a dispersion of −84 ps/nm/km, and a dispersion slope of −0.9 ps/nm$^2$/km.

TABLE 2

|  | Δ1 | Outer r₁ | Δ2 | Outer r₂ | Δ3 | Ctr. R₃ | H. Ht. Width | $D_{1590}$ | $D_{slope}$ | $\kappa_{1590}$ | Fiber cutoff | $MFD_{1559}$ |
|---|---|---|---|---|---|---|---|---|---|---|---|---|
| Ex. 7 | 1.88 | 1.64 | −.65 | 5.25 | .32 | 7.63 | 1.61 | −84 | −0.9 | 92 | 0.55 | 4.75 |

Consequently, in one embodiment which is optimized to enable broadband dispersion compensation for LEAF fiber across both the C-band and L-band, a first fiber (e.g. Example 5) may be employed to compensate for dispersion across the C-band, and a second fiber, (e.g., Example 7) may be employed to compensate for dispersion across the L-band. These two fibers could therefore be employed together within a single dispersion compensating module to compensate for dispersion over both the C-band (e.g., 1530–1565 nm) and L-band (e.g., 1565–1625 nm) transmission windows. These two fibers in combination are capable of extremely good dispersion compensation of optical communications systems which employ LEAF optical fiber. Such optical communications systems typically consists of, for example, at least a signal transmitter and signal receiver, and one or more dispersion compensating modules over the path of communication to compensate for dispersion which builds up in the transmitted signal.

Figure 5:
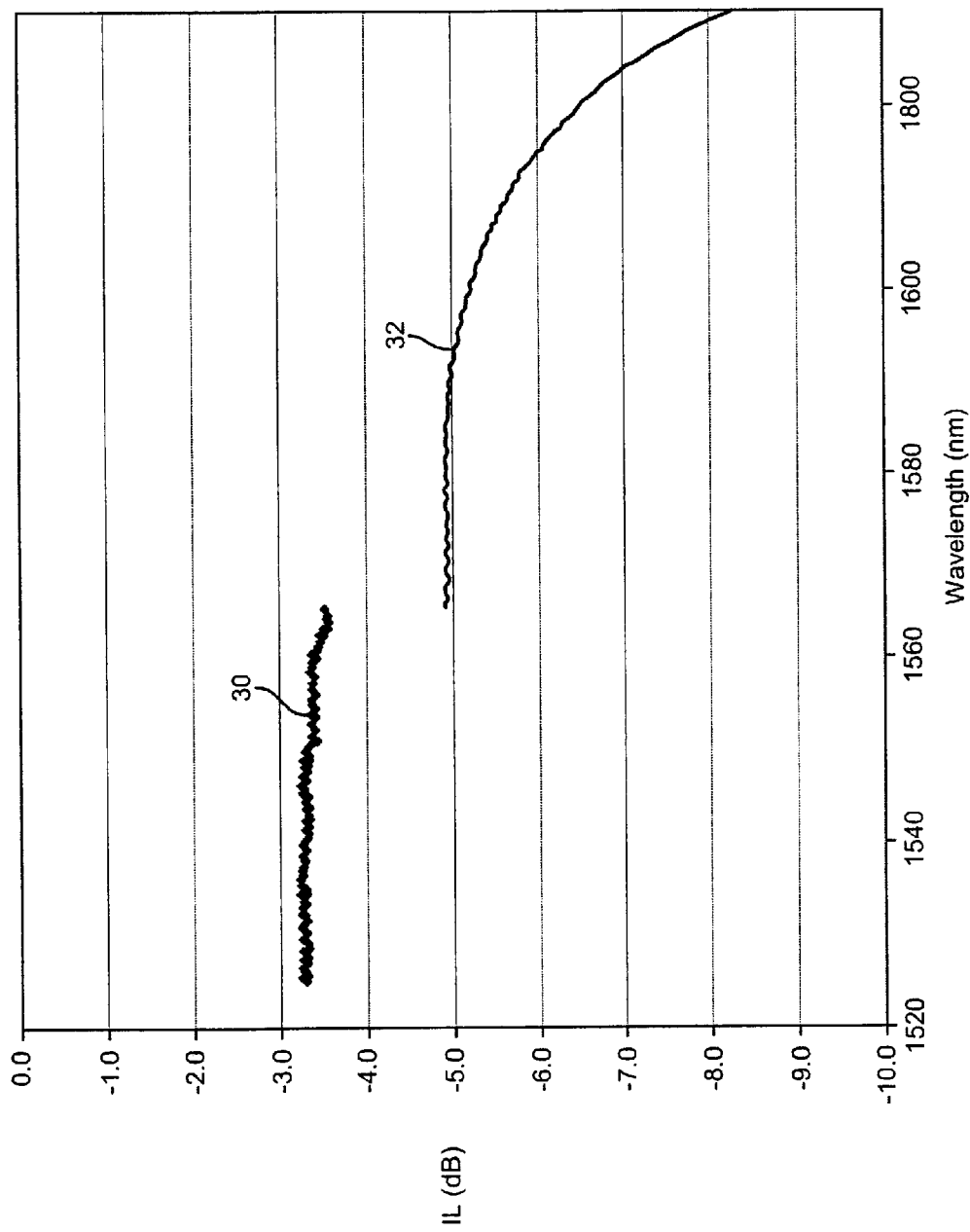
FIG. 5 illustrates insertion loss as a function of wavelength for a C and L-band fiber made in accordance with the invention.

FIG. 5 illustrates a plot of absolute insertion losses of these two fibers made in accordance with the invention, a first fiber 30 (Example 5) having a κ of 48 at 1550 and a second fiber 32 (Example 7) having a κ of 92 at 1590 nm. As can be seen from FIG. 5, the lower κ of the Example 5 fiber is very well suited for dispersion and dispersion slope compensation of Corning's LEAF optical fiber in the C-band, with relative flat insertion loss across the C-band. Similarly, the higher κ of the Example 7 fiber is well suited for dispersion and dispersion slope compensation of LEAF in the L band. The bend edge of the fiber does not start until 1615 nm.

Based on the fiber loss per unit length shown for Examples 5 and 7 in Tables 1 and 2 and insertion loss numbers for the module shown in FIG. 8, we can see that a substantial portion of the module loss comes from the splices.

tems (up to 600 km) or Ultra long haul (>1000 km) and broadband (32 nm) systems are expected to be dispersion limited. However, in either case because of the complexity of the system and the very large number of components required to make the system work effectively, it is extremely difficult to know if the edge channels are truly in a dispersion limited regime. Hence, it is difficult to evaluate the true impact of these very high negative slope dispersion compensating fibers. However, in a re-circulating loop (125 km loop) test conducted with 32 channels in the C-band it was found that ever after 6 round trips all of the channels had a Q that was greater than 8.5 dB.

Figure 4:
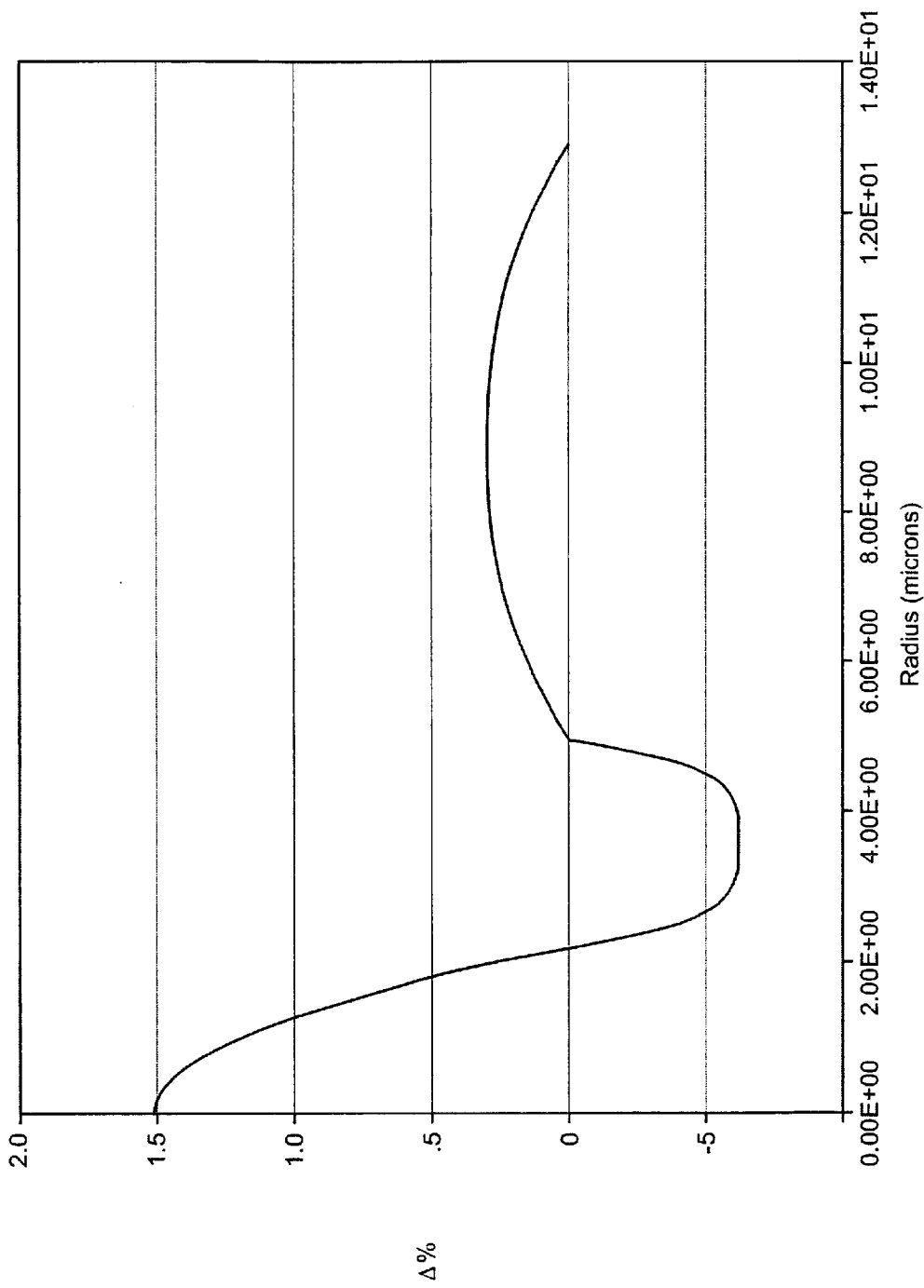

FIG. 4 illustrates an alternative embodiment of the invention having a relatively wider annular segment 16 compared to the other embodiments. Examples 8, 9, and 10 have profiles similar to those in FIG. 4 and having the parameters as set forth in Table 3. Fibers described in Table 3 fall within a particularly preferred range of refractive index profiles in accordance with the invention, in which Δ1 ranges between 1.0 and 2.0 percent and comprises an outer radius $r_1$ (drawn to the point where the profile intersects the x-axis) between about 1 to 3 microns, Δ2 is less than about −0.3 percent, and has an outer radius $r_2$ which ranges between about 4.0 and 7.0 microns, and Δ3 is between about 0.2 to 0.8 percent and comprises a center radius $r_3$ (drawn to the center of the segment) between about 7 to 12 microns, and a Δ3 half height peak width of about 5 to 10 microns. The profiles are particular good for obtaining low kappas at 1550 nm, e.g. between about 45 and 65.

TABLE 3

|  | Δ1 | Outer r₁ (μm) | Δ2 | Outer r₂ (μm) | Δ3 | Ctr. r₃ (μm) | H. Ht. Width (μm) | $D_{1550}$ | $D_{slope}$ | Kappa |
|---|---|---|---|---|---|---|---|---|---|---|
| Ex. 8 | 1.5 | 2.2 | −.35 | 5.2 | .3 | 10 | 8.5 | −90 | −1.45 | 62 |
| Ex. 9 | 1.5 | 2.2 | −.50 | 5.0 | .25 | 9.0 | 5.5 | −128 | −2.31 | 55 |
| Ex. 10 | 1.7 | 2.1 | −.60 | 4.5 | .25 | 9.5 | 8.0 | −165 | −3.3 | 50 |

TABLE 4

|  | Δ1 | Outer r₁ (μm) | Δ2 | Outer r₂ (μm) | Δ3 | Ctr. r₃ (μm) | H. Ht. Width (μm) | $D_{1550}$ | $D_{slope}$ | Kappa |
|---|---|---|---|---|---|---|---|---|---|---|
| Ex. 11 | 1.8 | 1.8 | −.69 | 5.0 | 0.7 | 7.5 | 0.9 | −120 | −1.6 | 75 |

Figure 6:
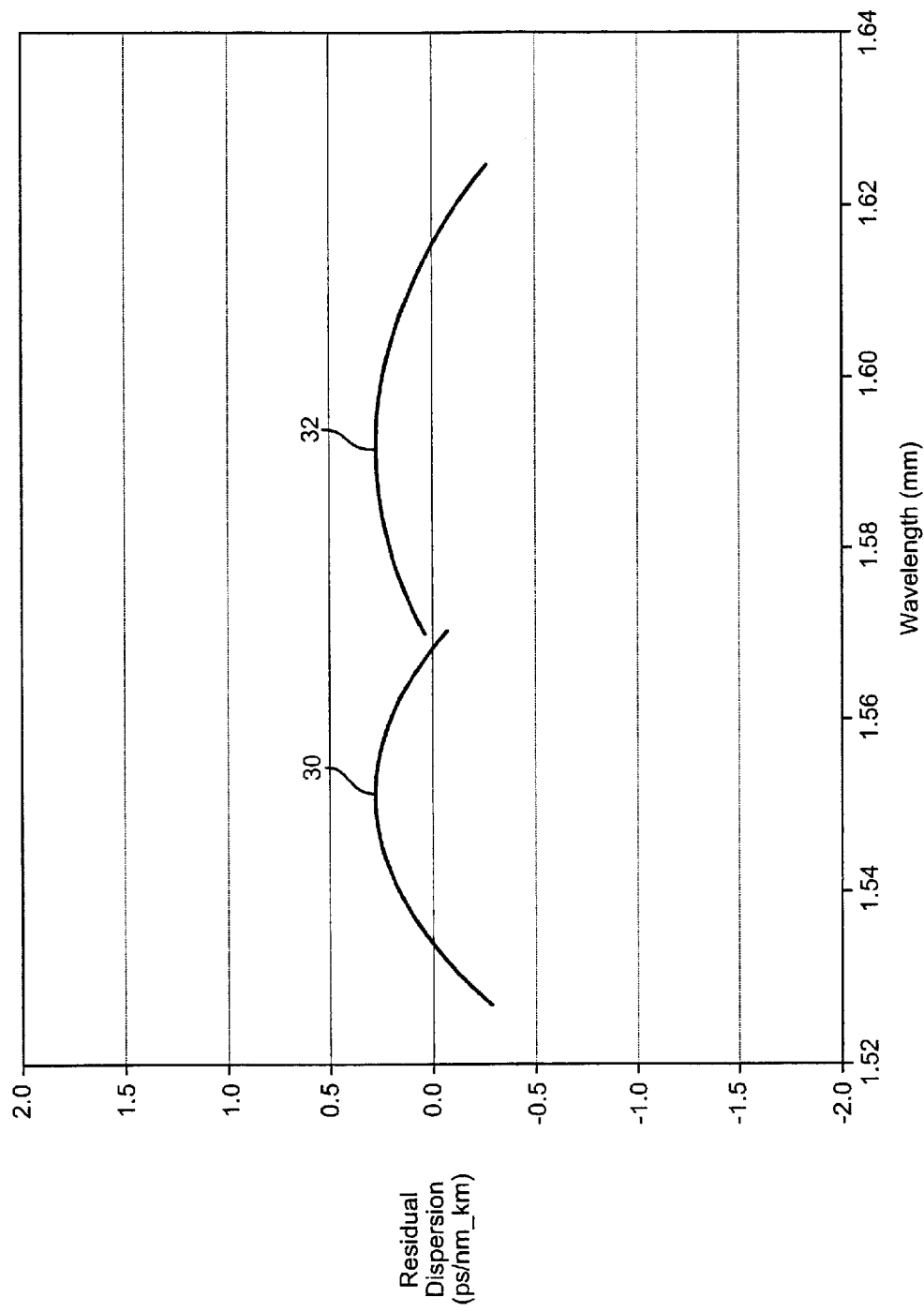
FIG. 6 illustrates residual dispersion per unit length as a function of wavelength when a C and L band dispersion compensating fiber made in accordance with the invention are used in combination with Corning LEAF® optical fiber.

In FIG. 6 we show the residual dispersion as a function of wavelength while using the C-band fiber 30 (κ=49) in the C-band and the L-band fiber 32 (κ=92) in the L-band. As can be seen the residual dispersion across the C and the L-band combined band is less than +/− 0.25 ps/nm-km.

Figure 7:
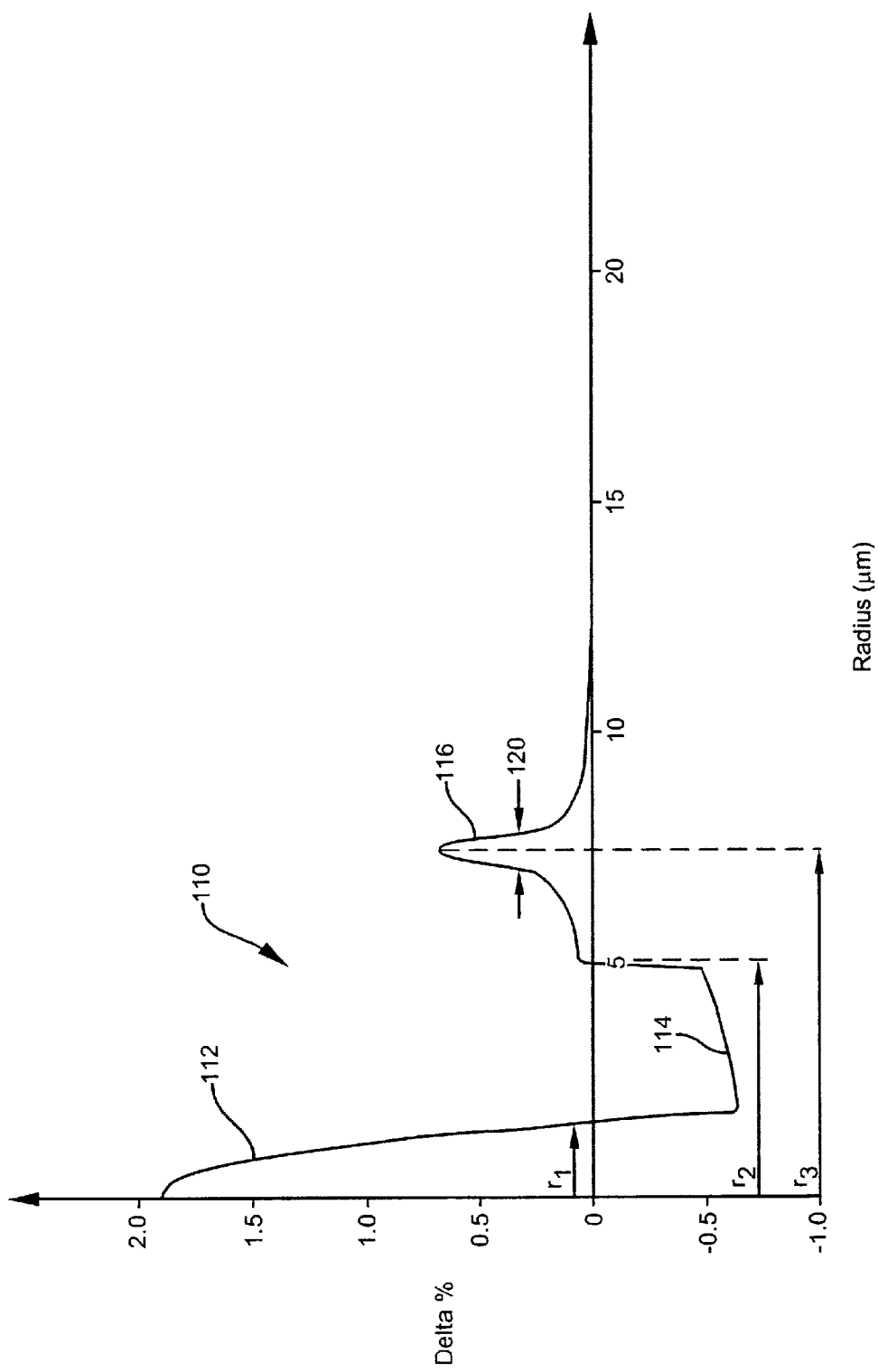
FIG. 7 illustrates a refractive index profile of a fiber made in accordance with the present invention.

The true impact of dispersion slope compensation can only be realized in systems where the edge channels are dispersion limited. Generally speaking, edge channels in Ultra-broad band (>40 nm bandwidth) and long haul sys- FIG. 7 illustrates another embodiment of the slope compensating optical fiber in accordance with the present invention. This embodiment best illustrates the spacing of the up-doped ring region 116 away from the outer diameter r2 of the down-doped moat region 114. In this embodiment of the fiber, designated as example 11 in Table 4 above, the fiber profile 110 shown in FIG. 7 provides a dispersion at 1550 nm which is between about −30 and −200 ps/nm/km; a dispersion slope less than −1.1 ps/nm²/km; and a kappa value between 40 and 95. This provides a fiber that may compensate for both slope and dispersion by exhibiting a relatively large negative slope and relatively large negative dispersion. More preferably, the dispersion slope compensating optical fiber in accordance with the invention includes a dispersion at 1550 nm which is between −90 and −150 ps/nm/km; a dispersion slope less than −1.5 ps/nm²/km; and a kappa value between 40 and 95. The above-mentioned dispersion slope compensating optical fiber preferably includes a refractive index profile 110 as shown in FIG. 7 having a central segment 112 having a Δ1 and an outer radius r1 and a second annular moat segment 114 having a Δ2 and having an outer radius r2 wherein, preferably, r1 is less than 2.0 microns and r2 is between 4.0 and 7.0 microns and wherein the core moat ratio taken as r1 divided by r2 is less than 0.38, and more preferably less than 0.34.

The preferred embodiment of the profile 110 has a Δ1 between about 1.6 percent to 2.0 percent. The outer radius $r_1$ of the central core region 112 is located at between about 1.5 to 2.0 microns. The annular moat region 114 surrounding and in contact with the central region 112 has a Δ2 which is preferably less than about −0.6 percent and has an outer radius $r_2$ between about 4.5 and 6 microns. The spaced ring region 116 includes Δ3 is between about 0.4 to 0.8 percent and comprises a center radius $r_3$ between about 6 to 10 microns. Preferably the peak of the region 116 is located such that r3 is spaced from r2 by greater than 1.0 microns, and more preferably greater than 2 microns.

A dispersion compensating optical fiber in accordance with the invention that is particularly effective at compensating for dispersion or dispersion slope in the C and L bands has a refractive index profile, as shown in FIG. 7, which is selected to result in a dispersion slope in said fiber which is less than −1.5 ps/nm²/km over the wavelength range 1525 to 1565 nm; a dispersion at 1550 nm which is less than −75 ps/nm/km; and a kappa value, obtained by dividing the dispersion by the dispersion slope, that is between 40 and 90. The refractive index profile of said fiber comprises a central segment having a Δ1, a second annular segment which surrounds said central segment having Δ2, a third annular segment which surrounds said second segment having Δ3 and a cladding layer comprising Δc, wherein Δ1>Δ3>Δc>Δ2.

In accordance with another embodiment, a dispersion compensating fiber includes a refractive index profile selected to result in a dispersion slope in said fiber which is less than −0.8 ps/nm²/km over the wavelength range 1525 to 1565 nm; a dispersion at 1550 nm which is less than −100 ps/nm/km; and a kappa value obtained by dividing the dispersion by the dispersion slope, that is between 40 and 90. The refractive index profile of this embodiment of fiber comprises a central segment having a Δ1 and an outer radius r1, a second annular segment which surrounds the central segment having a Δ2 and an outer radius r2, a third annular segment which surrounds the second segment having a Δ3 and a cladding layer comprising Δc, wherein Δ1>Δ3>Δc>Δ2, and wherein the core moat ratio r1/r2 is less than 0.4.

It will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

What is claimed is:

1. A dispersion compensating optical fiber, comprising:
   a refractive index profile selected to provide, in the $LP_{01}$ mode,
   a dispersion at 1550 nm between −90 and −150 ps/nm/km;
   a dispersion slope at 1550 nm of less than −1.5 ps/nm²/km; and
   a kappa value, obtained by dividing the dispersion at 1550 nm by the dispersion slope at 1550 nm, of between 40 and 95.

2. A dispersion compensating optical fiber, comprising:
   a refractive index profile selected to provide, in the $LP_{01}$ mode,
   a dispersion at 1550 nm between −90 and −150 ps/nm/km;
   a dispersion slope at 1550 nm of less than −1.5 ps/nm²/km; and
   a kappa value, obtained by dividing the dispersion at 1550 nm by the dispersion slope at 1550 nm, of between 40 and 95, wherein the refractive index Profile further includes
   a central segment within the refractive index profile having a Δ1 and an outer radius r 1,
   a second annular segment within the profile which surrounds the central segment having a Δ2 and an outer radius r2, and
   a third annular segment in the profile which surrounds the second segment having a Δ3, and a cladding layer comprising Δc, wherein Δ1>Δ3>Δc>Δ2.

3. The dispersion compensating optical fiber of claim 2 wherein a core moat ratio r1/r2 is less than 0.38.

4. The dispersion slope compensating optical fiber of claim 2 wherein the core moat ratio is less than 0.34.

5. The dispersion compensating optical fiber of claim 2 wherein dispersion slope is between about −1.5 and −3.0 ps/nm²/km over the wavelength range 1530 to 1560 nm.

6. The dispersion compensating optical fiber of claim 5 wherein dispersion slope is between about −1.8 and −2.5 ps/nm²/km over the wavelength range 1530 to 1560 nm.

7. The dispersion compensating optical fiber of claim 2 wherein the dispersion at 1550 nm is less than −100 ps/nm/km.

8. The dispersion compensating optical fiber of claim 2 wherein an outer radius $r_1$ less than 2 microns.

9. The dispersion compensating optical fiber of claim 2 further comprising:
   Δ1 is between 1.6 and 2.0 percent and comprises an outer radius r1 between about 1.5 to 2 microns,
   Δ2 is less than about −0.6 percent, and comprises an outer radius $r_2$ between about 4.5 and 6 microns, and
   Δ3 is between about 0.4 to 0.8 percent and comprises a center radius $r_3$ between about 6 to 10 microns.

10. The dispersion slope compensating optical fiber of claim 2 wherein $r_3$ is spaced from $r_2$ by greater than 1.0 microns.

11. A dispersion compensating module comprising at least one fiber in accordance with claim 2.

12. An optical communication system comprising at least one fiber in accordance with claim 2 and a nonzero dispersion shifted fiber wherein dispersion of the nonzero dispersion shifted fiber in the C-band from 1530–1565 nm is compensated.

13. An optical communication system comprising at least one fiber made in accordance with claim 2 and a nonzero dispersion shifted fiber wherein dispersion of the nonzero dispersion shifted fiber in the L-band from 1565–1625 nm is compensated.

* * * * *